United States Patent
You et al.

(10) Patent No.: US 12,177,904 B2
(45) Date of Patent: Dec. 24, 2024

(54) RANDOM ACCESS METHOD AND DEVICE

(71) Applicant: GUANGDONG OPPO MOBILE TELECOMMUNICATIONS CORP., LTD., Guangdong (CN)

(72) Inventors: Xin You, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 405 days.

(21) Appl. No.: 17/589,042

(22) Filed: Jan. 31, 2022

(65) Prior Publication Data
US 2022/0159732 A1 May 19, 2022

Related U.S. Application Data

(63) Continuation of application No. PCT/CN2019/099525, filed on Aug. 6, 2019.

(51) Int. Cl.
*H04W 74/0833* (2024.01)
*H04B 7/185* (2006.01)
*H04W 56/00* (2009.01)

(52) U.S. Cl.
CPC .... *H04W 74/0833* (2013.01); *H04B 7/18513* (2013.01); *H04W 56/006* (2013.01)

(58) Field of Classification Search
CPC .......... H04W 74/0833; H04W 56/006; H04W 56/0045; H04W 84/06; H04B 7/18513; H04B 7/1851

See application file for complete search history.

(56) References Cited

U.S. PATENT DOCUMENTS

| | | | |
|---|---|---|---|
| 2011/0294510 A1* | 12/2011 | Wigren | G01S 5/10 455/440 |
| 2014/0044108 A1* | 2/2014 | Earnshaw | G01S 5/0063 370/336 |
| 2018/0241464 A1 | 8/2018 | Michaels | |
| 2021/0175964 A1* | 6/2021 | Kusashima | H04W 56/0005 |

FOREIGN PATENT DOCUMENTS

| | | |
|---|---|---|
| CN | 103701517 A | 4/2014 |
| CN | 109565696 A | 4/2019 |
| CN | 109788548 A | 5/2019 |
| WO | 2019097922 A1 | 5/2019 |
| WO | 2019109270 A1 | 6/2019 |

OTHER PUBLICATIONS

ZTE. S1mechips, MediaTek Inc; Ericsson, Huawei. HiSilicon; May 13-May 17, 2019, 3GPP TSG~RAN WG2 Meeting #106; Tdoc R2-1908246; pp. 1-14 (Year: 2019).*

(Continued)

*Primary Examiner* — Farid Seyedvosoghi
(74) *Attorney, Agent, or Firm* — Ladas & Parry LLP

(57) ABSTRACT

A random access method and device are provided, which can reduce the bit used to indicate the TA. The method includes: a terminal device determines a first TA; the terminal device sends a first message in a random access process based on the first TA.

25 Claims, 4 Drawing Sheets

(56) References Cited

OTHER PUBLICATIONS

Ericsson, On random access procedures for NTN, Tdoc R2-1907296, 3GPP TSG-RAN WG2 #106, Reno, Nevada, US, May 13-May 17, 2019.
The first Office Action of corresponding Chinese application No. 201980094209.X, dated Jun. 21, 2023.
International Search Report (ISR) dated Apr. 24, 2020 for Application No. PCT/CN2019/099525.
ZTE et al. "Tracking Area Management and Paging Handling in NTN" 3GPP TSG RAN WG3#103, R3-190139, Feb. 16, 2019(Feb. 16, 2019). pp. 1-15.
The EESR of corresponding European application No. 19940884.0, dated Jun. 8, 2022.
Nokia, Nokia Shanghai Bell, Doppler Compensation, Uplink Timing Advance and Random Access in NTN, R1-1906087, 3GPP TSG RAN WG1 Meeting #97, Reno, USA, May 13-17, 2019.
ZTE, Sanechips, MediaTek Inc, Ericsson, Huawei, HiSilicon, Random Access Procedure and RACH Capacity in NTN, R2-1908246, 3GPP TSG-RAN WG2 Meeting #106, Reno, USA, May 13-May 17, 2019.

* cited by examiner

RANDOM ACCESS METHOD AND DEVICE

CROSS REFERENCE TO RELATED APPLICATION

This application is a continuation of International Application No. PCT/CN2019/099525, filed on Aug. 6, 2019. The above application is hereby incorporated by reference in its entirety.

TECHNICAL HELD

Embodiments of the present application relate to the field of communication, and more specifically, to a random access method and device.

BACKGROUND

In a cellular network, a value range of a timing advance (TA) used by a terminal device is fixed due to a limited distance between a network device and the terminal device. However, in a non-terrestrial network (NTN) system, the distance between the terminal device and a satellite can be very large as satellite communication is used to provide communication services to ground users, with the distance up to 35786 km. As the message transmission delay increases, the transmission of message in the random access process will be affected. Therefore, how to implement effective random access in the NTN system has become an urgent problem to be solved.

SUMMARY

The present application provides a random access method and device, which can implement effective random access in the NTN system.

In a first aspect, a random access method is provided, including: determining, by a terminal device, a first timing advance TA; and sending, by the terminal device, a first message in a random access process based an the first TA.

Therefore, the terminal device sends the first message in the random access process with the first TA, thereby reducing the impact of transmission delay on the random access process, and realizing effective transmission of the first message.

In an embodiment, determining the first TA according to location information of the terminal device and/or a second TA from a network device when the terminal device has positioning capability; and/or, determining the second TA as the first TA when the terminal device does not have positioning capability.

Since the network device only needs to indicate the shorter second TA, and the terminal device can determine the actually used first TA based on the second TA by itself, the bit overhead caused by the network device indicating TA to each terminal devices respectively is saved, and each terminal device can flexibly select a suitable TA for random access based on its own location information, which effectively improves the performance of the random access.

In a second aspect, a random access method is provided, including: determining a format of a random access response RAR message in a random access process, where the RAR message includes a timing advance TA adjustment value, and the TA adjustment value is used for a terminal device to determine a third TA used to transmit a third message in the random access process.

In a third aspect, a terminal device is provided, and the terminal device can execute the method of the foregoing first aspect or method in any possible implementation of the first aspect. Specifically, the terminal device may include a functional module for executing the method of the foregoing first aspect or method in any possible implementation of the first aspect.

In a fourth aspect, a communication device is provided, and the communication device can execute the method of the foregoing second aspect or method in any possible implementation of the second aspect. Specifically, the communication device may include a functional module for executing the method of the foregoing second aspect or method in any possible implementation of the second aspect.

In a fifth aspect, a terminal device is provided, including a processor and a memory. The memory is configured to store a computer program, and the processor is configured to call and run the computer program stored in the memory m execute the method of the foregoing first aspect or method in any possible implementation of the first aspect.

In a sixth aspect, a communication device is provided, including a processor and a memory. The memory is configured to store a computer program, and the processor is configured to call and run the computer program stored in the memory to execute the method of the foregoing second aspect or method in any possible implementation of the second aspect.

In a seventh aspect, an apparatus for random access is provided, including a processor. The processor is configured to call and run a computer program from a memory, enabling a device installed with the apparatus to execute the method of the foregoing first aspect or method in any possible implementation of the first aspect. The apparatus is, for example, a chip.

In an eighth aspect, an apparatus for random access is provided, including a processor. The processor is configured to call and run a computer program from the memory, enabling a device installed with the apparatus to execute the method of the foregoing second aspect or method in any possible implementation of the second aspect. The apparatus is, for example, a chip.

In a ninth aspect, a computer readable storage medium, configured to store a computer program that enables a computer to execute the method of the foregoing first aspect or method in any possible implementation of the first aspect.

In a tenth aspect, a computer readable storage medium, configured to store a computer program that enables a computer to execute the method of the foregoing second aspect or method in any possible implementation of the second aspect.

In an eleventh aspect, a computer program product is provided, which includes computer program instructions that enable a computer to execute the method of the foregoing first aspect or method in any possible implementation of the first aspect.

In a twelfth aspect, a computer program product is provided, which includes computer program instructions that enable a computer to execute the method of the foregoing second aspect or method in any possible implementation of the second aspect.

In a thirteenth aspect, a computer program is provided, which when running on a computer, enables the computer to execute the method of the foregoing first aspect or method in any possible implementation of the first aspect.

In a fourteenth aspect, a computer program is provided, which when running on a computer, enables the computer to execute the method of the foregoing, second aspect or method in any possible implementation of the second aspect.

In a fifteenth aspect, a communication system is provided, including a terminal device and a network device.

The network device is configured to send a second TA to the terminal device.

The terminal device is configured to: receive the second TA; determine a first TA according to location information of the terminal device and/or the second TA; and send a first message in the random access process based on the first TA.

DESCRIPTION OF EMBODIMENTS

The technical solutions in the embodiments of the present application will be described below in conjunction with the accompanying drawings.

The technical solutions of the embodiments of the present application can be applied to various communication systems, for example: global system of mobile communication (GSM) system, code division multiple access (CDMA) system, wideband code division multiple access (WCDMA) system, long term evolution (LTE) system, LTE frequency division duplex (FDD) system, LTE time division duplex (TDD) system, advanced long term evolution (LTE-A) system, new radio (NR) system, evolution system of NR system, LTE-based access to unlicensed spectrum (LTE-U) system, NR-based access to unlicensed spectrum (NR-U) system, universal mobile telecommunication system (UNITS), wireless local area networks (WLAN), wireless fidelity (WiFi), future 5G systems or other communication systems, and the like.

Generally speaking, traditional communication systems support a limited number of connections and are easy to implement. However, with the development of communication technology, mobile communication systems will not only support traditional communication, but also support communication such as device to device (D2D) communication, machine to machine (M2M) communication, machine type communication (MTC), and vehicle to vehicle (V2V) communication, etc. The embodiments of the present application can also be applied to these communication systems.

The communication system in the embodiment of the present application can be applied to a carrier aggregation (CA) scenario, a dual connectivity (DC) scenario, a stand-alone (SA) network deployment scenario, and the like.

Figure 1:
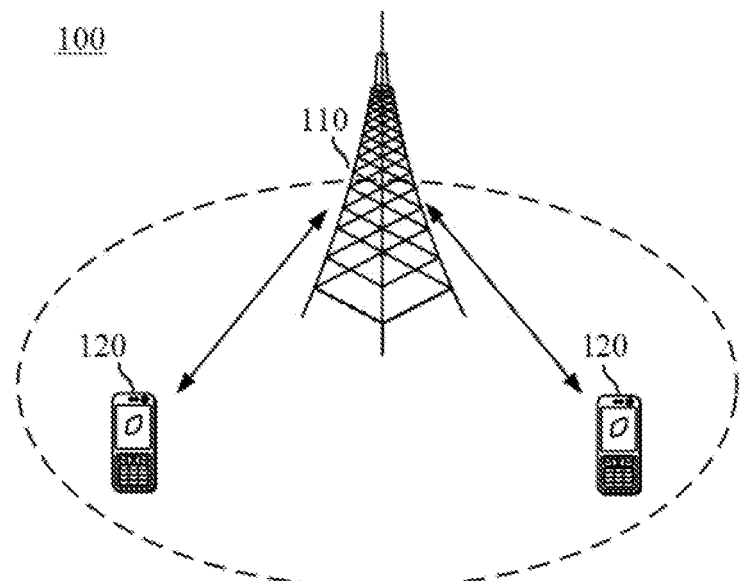
FIG. 1 is a schematic diagram of a possible wireless communication system applied by an embodiment of the present application.

Exemplarily, the communication system 100 applied in the embodiments of the present application is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area, and may communicate with the terminal device located in the coverage area.

In an embodiment, the network device 110 may be a base transceiver station (BTS) in a GSM system or a CDMA system, a NodeB (NB) in a WCDMA system, or an evolutional NodeB (eNB or eNodeB) in a LTE system, or a wireless controller in a cloud radio access network (CRAN), or the network device can be a mobile switching center, relay station, access point, vehicle device, wearable device, hub, switch, bridge, routers, network-side devices in 5G networks, or network devices in the future evolutional public land mobile network (PLMN), and the like.

The wireless communication system 100 also includes at least one terminal device 120 located within the coverage area of the network device 110. The terminal device 120 may be mobile or fixed. Alternatively, the terminal device 120 may refer to a user device, an access terminal, a user unit, a user station, a mobile station, a remote station, a remote terminal, a mobile device, a user terminal, a terminal, a wireless communication device, a user agent, or a user apparatus. The terminal device can also be a cellular phone, a cordless phone, a session initiation protocol (SIP) phone, a wireless local loop (WLL) station, a personal digital assistant (PDA), a handheld device with wireless communication function, a computing device or other processing devices connected to wireless modems, vehicle device, wearable devices, terminal devices in the future 5G network or a terminal device in future evolutional public land mobile network (PLMN), and the like, which are not limited in the embodiments of the present application. In an embodiment, device to device (D2D) communication may also be performed between the terminal devices 120.

The network device 110 may provide services for a cell, and the terminal device 120 communicates with the network device 110 through transmission resources used by the cell, such as frequency domain resources, or spectrum resources. The cell may be a cell corresponding to the network device 110. The cell may belong to a macro base station or a base station corresponding to a small cell. The small cell here may include: metro cell, micro cell, pico cell, femto cell, and the like. These small cells have the characteristics of small coverage and low transmit power, and are suitable for providing high-rate data transmission services.

FIG. 1 exemplarily shows one network device and two terminal devices, but the present application is not limited to this. The wireless communication system 100 may include a plurality of network devices, and the coverage area of each network device may include other numbers of terminal devices. In addition, the wireless communication system 100 may also include other network entities such as a network controller and a mobility management entity.

At present, the 3rd generation partnership project (3GPP) is studying non-terrestrial network NTN) technology. NTN generally uses satellite communication to provide communication services to ground users. Compared with terrestrial cellular network communication, satellite communication has many unique advantages. First of all, satellite communication is not restricted by the region of user. For example, general terrestrial communication cannot cover areas where communication device cannot be installed such as oceans, mountains, and deserts, or areas that cannot be covered by communication due to sparse population. As for satellite communication, as a satellite can cover a larger area of ground, and as the satellite can orbit the earth, therefore, every corner of the earth can be covered by satellite communications theoretically, Secondly, satellite communication has higher social value. Satellite communication can cover remote mountainous areas, poor and backward countries or regions at a low cost, so that people in these areas can enjoy advanced voice communication and mobile Internet technology, which is conducive to narrowing down the digital gap with developed areas and promoting the development of these areas. Third, the satellite communication has long communication distance, and the communication cost does not increase significantly when the communication distance increases. Finally, satellite communication has high stability, and it is not restricted by natural disasters.

Communication satellites are divided into low-earth orbit (LEO) satellites, medium-earth orbit (MEO) satellites, geostationary earth orbit (GEO) satellites, and highly elliptical orbit (HEO) satellites and the like, according to their orbital heights. At the current stage, it is mainly researched on LEO satellites and GEO satellites. Among them, the altitude range of LEO satellites is 500 km to 1500 km, and the corresponding orbital period is about 1.5 hours to 2 hours. The signal propagation delay of single-hop communication between users is generally less than 20 ms. The maximum satellite viewing, time is 20 minutes, the signal propagation distance is short, the link loss is small, and the transmission power requirements of the user terminal are not high. The orbital height of the GEO satellite is 35786 km, the rotation period around the earth is 24 hours, and the signal propagation delay of single-hop communication between users is generally 250 ms.

In order to ensure the coverage of satellite and increase the system capacity of the entire satellite communication system, satellites use multiple beams to cover the ground. A satellite can form dozens or even hundreds of beams to cover the ground; and a satellite beam can cover ground area of tens to hundreds of kilometers in diameter.

In a NTN system, the terminal device still needs to perform random access, Among them, the random access process can be triggered mainly by the following events: (1) the terminal device establishes a wireless connection when it initially accesses, at this time, the terminal device turns from a radio resource control (RRC) idle (RRC_IDLE) state to a RRC connection (RRC_CONNECTED) state; (2) RRC connection re-establishment process, so that terminal device can re-establish wireless connection after radio link failure; (3) terminal device needs to establish uplink synchronization with the new cell; (4) in RRC_CONNECTED state, download (DL) data arrives, while the uplink (UL) is in the out-of-synchronization state; (5) in the RRC_CONNECTED state, the lit data arrives, while the UL is in the out-of-synchronization state or there is no physical uplink control channel (PUCCH) resources used to send a scheduling request (SR); (6) SR failure; (7) synchronous reconfiguration request from RRC; (8) the terminal device changes from a RRC inactive (RRC_INACTIVE) state to the RRC_CONNECTED state; (9) establish time calibration in the process of adding a secondary cell (SCell), (10) request other system information (SI); (11) beam failure recovery.

The method in the embodiment of the present application is applicable to a 2-step random access process and a 4-step random access process.

Figure 2:
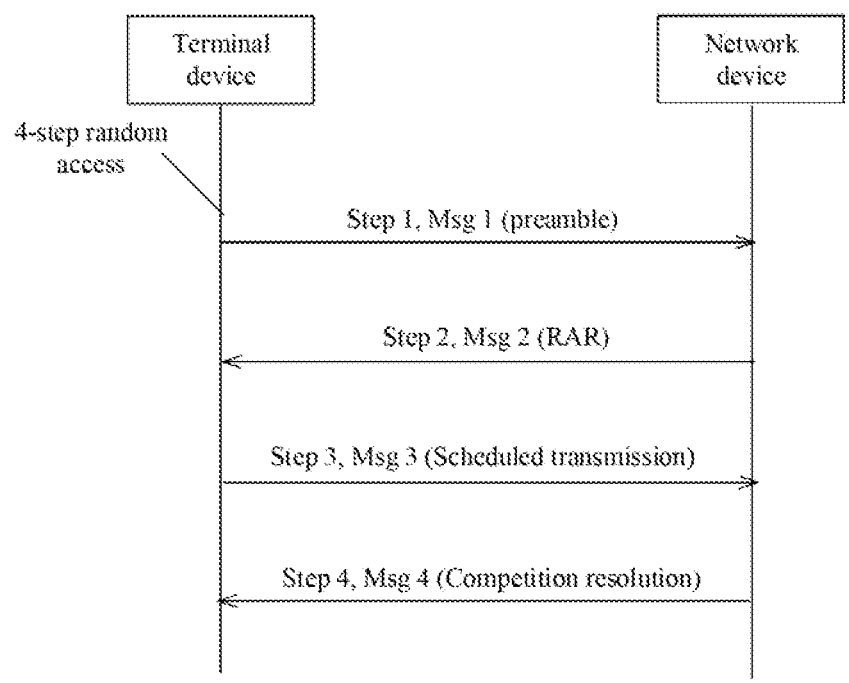
FIG. 2 is a schematic diagram of 4-step random access.

FIG. 2 is a flow interaction diagram of the 4-step random access. As shown in FIG. 2, the 4-step random access process can include the following four steps:

step 1, the terminal device sends a message (Msg) 1 to a network device.

The terminal device selects a physical random access channel (PRACH) resource, and sends its selected preamble on the selected PRACH. If it is a non-contention-based random access, the PRACH resource and preamble can be specified by the network device. Based on the preamble, the network device can estimate an uplink timing and the magnitude of the uplink grant (UL grant) resource required for the terminal to transmit Msg 3.

Step 2, the network device sends an Msg 2, that is, a random access response (RAR) message, to the terminal device.

After sending the Msg 1 by the terminal device, a random access response time window (ra-ResponseWindow) is activated, and a physical downlink control channel (PDCCH) scrambled by random access radio network temporary identity (RA-RNTI) is monitored within the time window. The RA-RNTI is associated with the time-frequency resource of the PRACH which is used by the terminal device to send the Msg 1.

After successfully receiving the PDCCH scrambled by RA-RNTI, the terminal device can obtain the physical downlink shared channel (PDSCH) scheduled by the PDCCH, which includes the RAR, where the RAR may include the following information:

backoff indicator (BI) included in the subheader of the RAR: used to indicate the backoff time for retransmission of Msg 1;

random access preamble identifier (RAP ID) in RAR: the network device responds to the received preamble index;

timing advance command (TAG) included in the payload of the RAR: used to adjust the uplink timing;

uplink grant (UL grant); used to schedule an uplink resource indication of Msg 3;

temporary cell-Radio network temporary identifier (Temporary C-RNTI): used to scramble the PDCCH of Msg 4 during initial access.

If the terminal device receives the PDCCH scrambled by the RAR-RNTI, and the RAR includes the preamble index sent by the terminal device itself, the terminal device considers that it has successfully received the random access response.

For non-contention-based random access, after the terminal device successfully receives Msg 2, the random access process ends. For contention-based random access, after the terminal device successfully receives Msg 2, it needs to continue to transmit Msg 3 and receive Msg 4.

Step 3, the terminal device sends Msg 3 on a resource scheduled by the network device.

Msg 3 is mainly used to inform the network device of what event triggered the random access process. For example, if it is a random access process of initial access, the terminal device carries device identification (UE ID) and establishment cause in Msg 3; if it is a RRC reestablishment, the terminal device carries connection state identification and establishment cause.

Step 4, the network device sends Msg 4, that is, a random access contention resolution message, to the terminal device.

Msg 4 is used for contention conflict resolution on the one hand, and for network device to transmit RRC configuration messages to terminal device on the other hand. There are two ways to resolve contention conflicts: one is, if the terminal device carries C-RNTI in Msg 3, Msg 4 uses C-RNTI scrambled PDCCH scheduling; the other is, if the terminal device does not carry C-RNTI in Msg 3, such as initial access, Msg 4 uses TC-RNTI scrambled. PDCCH scheduling. The conflict resolution is that the terminal device receives the PDSCH of Msg 4 and matches the common control channel (CCCH) service data unit (SDU) in the PDSCH.

Figure 3:
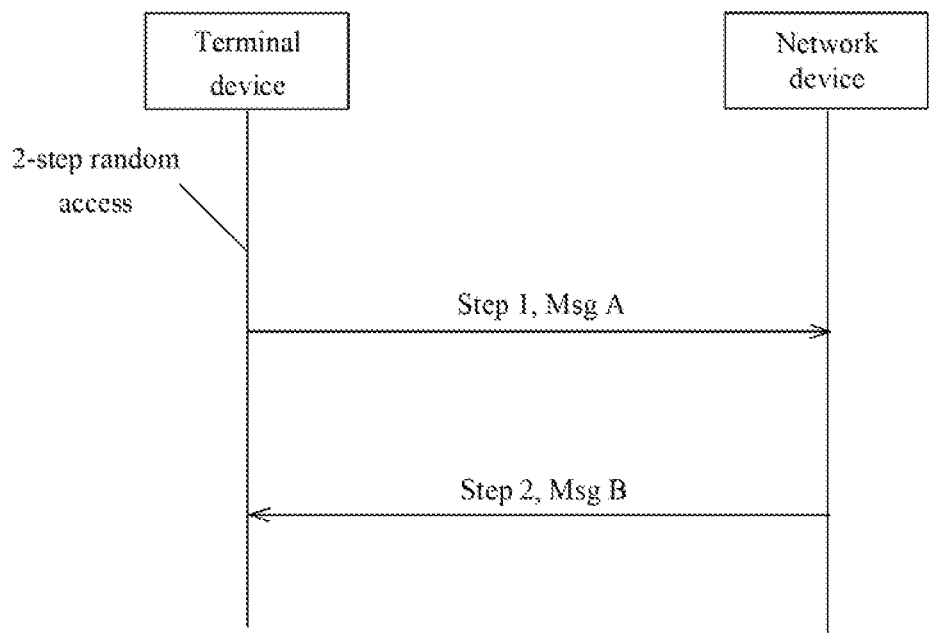
FIG. 3 is a schematic diagram of 2-step random access.

FIG. 3 is a flow interaction diagram of 2-step random access. Compared with the 4-step random access process, the 2-step random access process can reduce time delay and signaling overhead. As shown in FIG. 3, in step 1, the terminal device sends Msg A to the network device, where Msg A includes part or all of Msg 1 and Msg 3 in the 4-step random access process; in step 2, the network device sends Msg B to the terminal device, where Msg B includes part or all of Msg 2 and Msg 4 in the 4-step random access process. After sending Msg A, the terminal device activates the receiving window of Msg B, detects and receives Msg B in this window.

In a cellular network, the value range of the timing advance (TA) used by the terminal device is fixed due to the limited distance between the network device and the terminal device. However, in the NTN system, as it uses satellite communication to provide communication services to ground users, the distance between the terminal device and the satellite can be very large, and the transmission delay of message increases, therefore, the message transmission in the random access process will be affected.

The present application proposes a random access method, which can realize effective random access in the NTN system.

Figure 4:
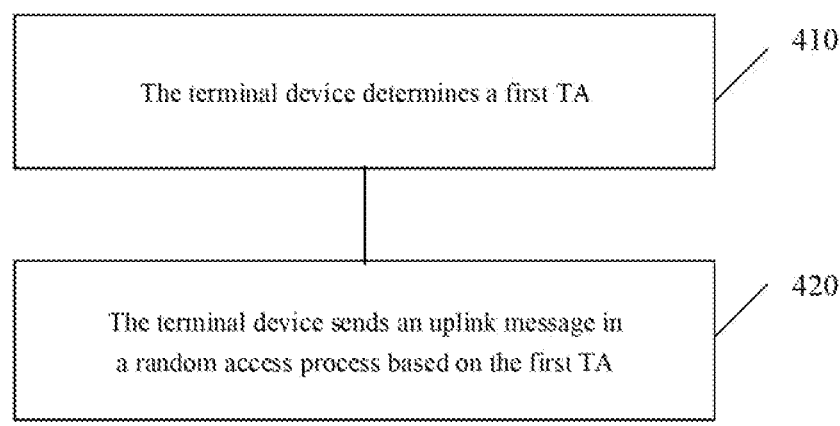
FIG. 4 is a flow interaction diagram of a random access method according to an embodiment of the present application.

FIG. 4 is a schematic flowchart of random access in an embodiment of the present application. The method 400 shown in FIG. 4 may be performed by a network device and a terminal device. The network device may be, for example, the network device 110 shown in FIG. 1, and the terminal device may be, for example, the terminal device 120 shown in FIG. 1.

The method 400 can be applied to the NTN system. However, the present application is not limited to this, and the method 400 can also be applied to other systems such as an unmanned aerial system, a new radio (NR) system, and the like.

As shown in FIG. 4, the method 400 includes:

In 410, the terminal device determines a first TA.

In 420, the terminal device sends an uplink message in the random access process based on the first TA.

Therefore, the terminal device sends a first message in the random access process through the first TA, thereby reducing the impact of transmission delay on the random access process, and realizing effective transmission of the first message.

In an embodiment, in an implementation, in 410, the terminal device may determine the first TA according to location information of the terminal device and/or a second TA from the network device.

Since the network device only needs to indicate the shorter second TA, the terminal device can determine the actually used first TA based on the second TA by itself, the bit overhead caused by the network device indicating TA to each terminal device respectively is saved, and each terminal device can flexibly select a suitable TA for random access based on its own location information, which effectively improves the performance of the random access.

For example, when the terminal device does not have the positioning capability, the terminal device may determine the second TA as the first TA. That is, the terminal device uses the second TA to send the uplink message.

Figure 5:
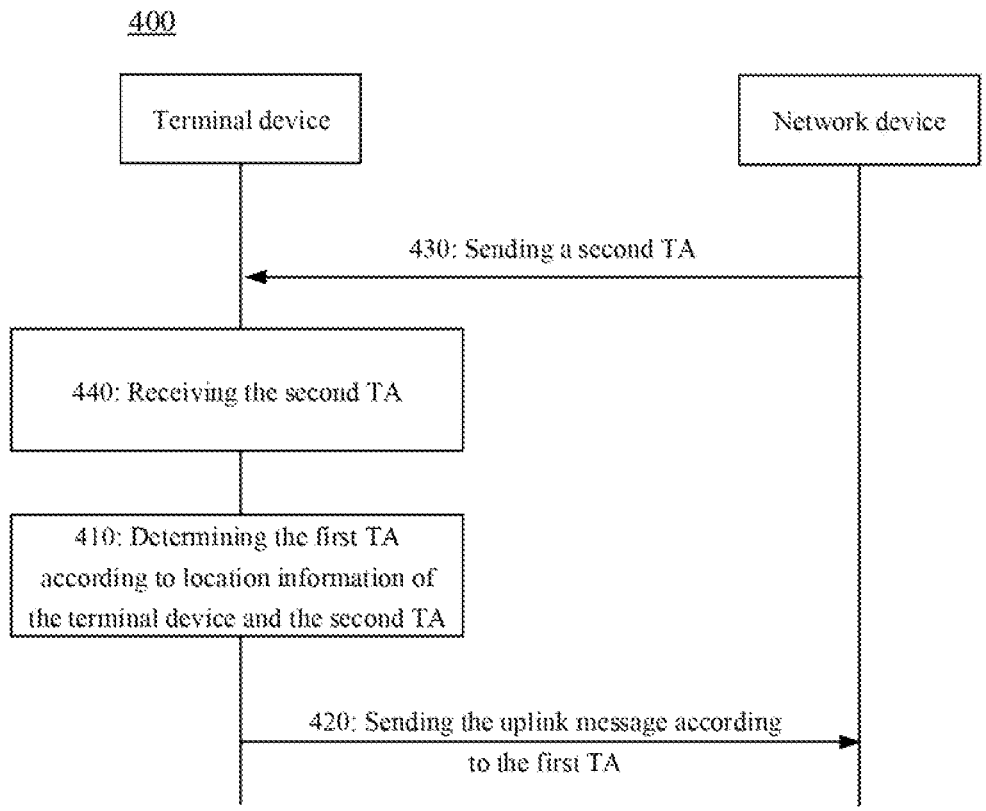
FIG. 5 is a possible implementation of the method shown in FIG. 4.

For another example, for a terminal device with the positioning capability, as shown in FIG. 5, the method 400 may further include sonic or all of the following steps.

In 430 the network device sends the second TA to the terminal device.

In 440, the terminal device receives the second TA.

In 410, the terminal device determines the first TA according to the location information of the terminal device and the second TA.

In 420, the terminal device sends the uplink message according to the first TA.

The second TA is configured by the network device, for example, the information of the second TA may be carried w a system message sent by the network device. The network device can broadcast the second TA to the terminal device through the system message. The second TA may also be agreed upon by the agreement, which is not limited in the present application.

The second TA can be considered as a nominal value. If the terminal device has the positioning capability, the terminal device can obtain its own location information to adjust the second TA according to the location information. For example, the terminal device determines an estimated value based on the location information, and further determines the actually used first TA based on the estimated value. If the terminal device does not have the positioning capability, the terminal device can use the second TA directly to send the uplink message.

Surety, a terminal device with positioning capability may also directly determine the second TA as the first. TA in some cases, that is, directly use the first TA to send the uplink message. Alternatively, the terminal device with positioning capability may also not use the second TA, but directly calculate the first TA based on its own location information.

Since the network device only needs to indicate the shorter second TA, the terminal device can determine the actually used first TA based on the second TA by itself, which saves the bit overhead caused by the network device indicating TA to each terminal device respectively, and each terminal device can flexibly select a suitable TA for random access based on its own location information, which effectively improves the performance of tile random access.

The uplink message may be, for example, the first message in a random access process, and the first message may be, for example, Msg 1 in a 2-step random access process or Msg A in a 4-step random access process.

The terminal device determines the first TA according to its location information and/or the second TA. In an embodiment, the terminal device determines first information used to characterize the distance between the terminal device and the network device according to the location information of the terminal device, and determine the first TA according to the first information and the second TA.

The first information includes, for example, at least one of the following information:

round-trip time (RTT);
a transmission delay;
satellite ephemeris
the distance between the terminal device and the network device;
the trajectory of the terminal device relative to the satellite.

In the following, the first information is the distance between the terminal device and the network device as an example to describe the method of the embodiments of the present application.

It should be understood that, in the embodiments of the present application, when the network device is a satellite, the distance between the terminal device and the network device is the distance between the terminal device and the satellite; or, when the network device is a ground station, the distance between the terminal device and the network device is the sum of the distance between the terminal device and the satellite and the distance between the satellite and the ground station.

Specifically, the network device described in the embodiment of the present application may be a satellite; it may also be a ground station, such as the various network devices shown in FIG. 1 above. For example, in the case of transparent GEO/LEO, satellites can implement the functions of base stations, therefore, network device is a satellite, and the distance between terminal device and network device is the distance between terminal device and satellite. For another example, in the case of regenerative GEO/LEO, the uplink data from the terminal device is sent to the ground station through satellite, and the downlink data from the ground station is sent to the terminal device through the satellite, therefore, the network device is the ground station. The distance between the terminal device and the network device is the sum of the distance between the terminal device and the satellite and the distance between the satellite and the around station.

The second TA may be any one of the following, for example:
a TA between a terminal device and a transparent GEO;
a TA between a terminal device and a transparent LEO;
a TA between a terminal device and a regenerative GEO;
a TA between a terminal device and a regenerative LEO;
a sum of the TA between the terminal device and the transparent GEO, and the TA between the transparent GEO and the ground station;
a sum of the TA between the terminal device and the transparent LEO, and the TA between the transparent LEO and the ground station.

In the case of LEO, the satellite is moving, and the distance between the satellite and the ground station is also changing; in the case of GEO, the satellite is not moving, and the distance between the satellite and the ground station is fixed.

In the embodiment of the present application, the terminal device may adjust the second TA based on a specific manner to obtain the first TA.

For example, the terminal device may determine an estimated value according to the distance from the network device, and use the sum of the estimated value and the second TA as the first TA. Among them, the larger the distance between the terminal device and the network device, the larger the estimated value; the smaller the distance between the terminal device and the network device, the smaller the estimated value. In an embodiment, there may be a mapping relationship between the distance and the estimated value. The terminal device selects an estimated value corresponding to the current distance in the mapping relationship according to the current distance with the network device, and uses the sum of the estimated value and the second TA as the first TA to be used.

For another example, the terminal device may determine the first TA according to the ratio of the distance from the network device to a preset distance. The first TA is a product of the ratio and the second TA.

Assuming that the second TA is 10 ms, the corresponding preset distance is 100 km. If the current distance between the terminal device and the network device is 150 km, the distance radio of the distance between the terminal device and the network device with the preset distance is 150 km/100 km=1.5, then the first TA is 10 ms×1.5=15 ms.

For another example, the terminal device may adjust the second TA according to an adjustment step length. The first TA is a sum of the second TA and N adjustment step lengths, where N is the number of adjustment periods traversed by the terminal device.

Assuming that the adjustment step length is 1 ms, the second TA carried in the system message is 10 ms, the system message also carries a time T1, and the time when the terminal device sends the first message is T2, then the first TA used to send the first message is 10+N1×1 ms, where N1 is the number of time periods elapsed by the terminal device from T1, that is, N1 is the ratio of |T2−T1| to the time period. Assuming that the time period is 80 ms, the first TA is 11 ms after a time period of 80 ms has elapsed from time T1, and the first TA is 12 ms after two time periods of 160 ins have elapsed from time T1. It should be understood that the adjustment step length can be positive or negative. The distance between the terminal device and the network device may change due to the movement of the satellite and the terminal device. If the distance becomes shorter and shorter, the adjustment step length can be negative, when the distance becomes larger and larger, the adjustment step length can be positive. The terminal device can adjust the second TA in a positive or negative direction according to the change trend of the distance.

The above adjustment period is a time period such as 80 ms, which is not limited by the embodiments of the present application. The adjustment period may also be the movement distance period of the terminal device, that is, every time the terminal device moves a certain distance, the TA used by the terminal device is adjusted with the adjustment step length. For example, the adjustment step length is 1 ms, the second TA carried in the system message is 10 ms, the system message also carries a distance D1, and the distance between the terminal device and the network device when sending the first message is D2, then the first TA used to send the first message is 10+N2×1 ms, where N2 is the number of distance periods that the terminal device traverses with respect to D1, that is, N2 is the ratio of |D2−D1| to the distance period. Assuming that the distance period is 2 km, the first TA is 11 ms after a distance period of 2 km is traversed with respect to D1, and the first TA is 12 ms after two distance period of 4 km is traversed with respect to D1.

For another example, the terminal device may periodically adjust the second TA according to an adjustment factor. The first TA is a product of N×M and the second TA, where N is a number of adjustment periods traversed by the terminal device, and M is the adjustment factor.

Assuming that the adjustment step is 1 ms, the second TA is 10 ms, and the adjustment factor is 1.2, the first TA is 10+N+1.2×1 ms, where N is the number of time periods elapsed by the terminal device, Assuming that the time period is 120 ms, the first TA is 11.2 ms after one time period of 120 ms, and the first TA is 12.4 ms after two time periods of 160 ms.

For another example, the terminal device may also determine the length of the first TA according to a mapping relationship between the TA length and the distance. The mapping relationship may be in the form of a table, for example, the mapping relationship between the TA length and the distance shown in Table 1. The terminal device determines the length of the TA used to send the first message according to the distance between the terminal device and the network device. For example, when the distance between the terminal device and the network device is in the distance range 1, the length of the first TA used is $TA_1$, when the distance between the terminal device and the network device is in the distance range N, the length of the first TA used is $TA_N$.

TABLE 1

| Distance | Length of TA |
|---|---|
| Distance range 1 | $TA_1$ |
| Distance range 2 | $TA_2$ |
| ... | ... |
| Distance range N | $TA_N$ |

In an embodiment, in an implementation, the method further includes: the terminal device determines a PRACH resource according to whether it has the positioning capability; the terminal device sends the first message with the PRACH resource.

For example, the PRACH resource includes a random access channel (RACH) occasion. When the terminal device has the positioning capability, it is determined that the RACH occasion is a first RACH occasion; or when the terminal device does not have the positioning capability, it is determined that be RACH occasion is a second RACH occasion. The duration of the second RACH occasion is greater than the duration of the first RACH occasion.

In other words, a terminal device with the positioning capability sends the first message based on a short RACH occasion, and a terminal device without the positioning capability sends the first message based on a long RACH occasion.

Two groups of RACH occasions (RO) can be configured, and the RACH occasions in each group of RACH occasions are of equal length. Since the terminal device cannot obtain an accurate TA duration when the terminal device does not have the positioning capability, the terminal device can use the second RACH occasion to transmit the first message in order not to affect the random access of the terminal device, and the second transmission occasion has a longer duration. The terminal device can obtain an accurate TA when the terminal device has the positioning capability, and therefore can select a shorter first RACH occasion to transmit the first message.

For another example, the PRACH resource includes a preamble. When the terminal device has the positioning capability, it is determined that the preamble is a first preamble; or when the terminal device does not have the positioning capability, it is determined that the preamble is a second preamble. The first preamble and the second preamble belong to two preamble groups configured separately for terminal devices with and without the positioning capability, respectively.

In other words, a terminal device with the positioning capability and a terminal device without the positioning capability select the preamble to be used in different preamble groups respectively.

Of course, when two preamble groups are not configured, terminal devices with and without the positioning capabilities can select the preamble randomly.

In addition, the terminal device sends the first message based on different PRACH resources. After the network device receives the first message, the network device can determine whether the terminal device has the positioning capability according to the PRACH resource used by the first message.

For example, when the RACH occasion is a first RACH occasion, the network device determines that the terminal device has the positioning capability; or, when the RACH occasion is a second RACH occasion, the network device determines that the terminal device does not have the positioning capability. The duration of the second RACH occasion is greater than the duration of the first RACH occasion.

For another example, when the preamble is the first preamble, the network device determines that the terminal device has the positioning capability; or, when the preamble is the second preamble, the network device determines that the terminal device does not have the positioning capability. The first preamble and the second preamble belong to two preamble groups configured separately for terminal devices with and without the positioning capability, respectively.

After the network device determines whether the terminal device has the positioning capability according to the PRACH resource, it can configure, based on whether the terminal device has the positioning, capability, the terminal device with matching resources required for subsequent message transmission, such as the format of the RAR message. This will be described in detail below in conjunction with FIG. 6.

Figure 6:
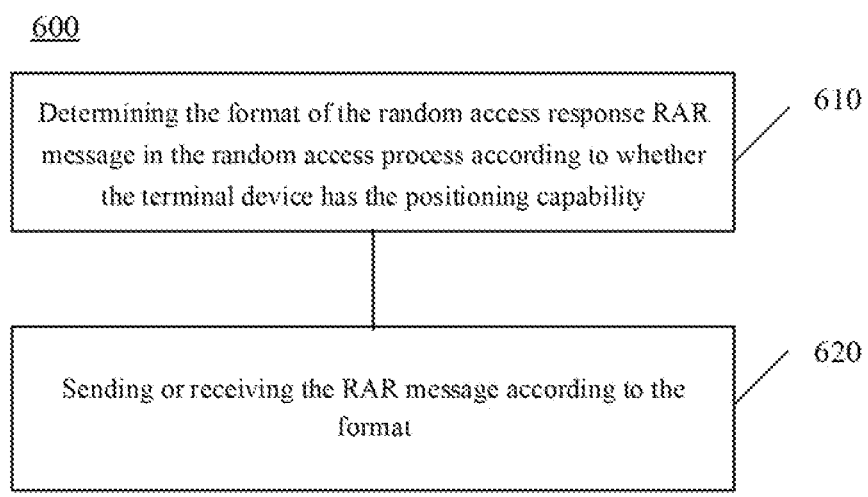
FIG. 6 is a flow interaction diagram of a random access method according to another embodiment of the embodiments of the present application.

FIG. 6 is a schematic flow chart of random access according to another embodiment of the present application. The method 600 shown in FIG. 6 may be executed by a network device or a terminal device. The network device may be, for example, the network device 110 shown in FIG. 1, and the terminal device may be, for example, the terminal device 120 shown in FIG. 1.

The method 600 can be applied to the NTN system. However, this application is not limited to this, and the method 600 can also be applied to other systems such as an unmanned aerial system, a NR system, and so on.

As shown in FIG. 6, the method 600 includes:

In 610, determining the format of the random access response RAR message in the random access process according to whether the terminal device has the positioning capability.

In 620, sending or receiving the RAR message according to the format of the RAR message.

The RAR message includes a TA adjustment value, and the TA adjustment value is used for the terminal device to determine a third TA used to transmit a third message in the random access process.

For example, the third TA is a sum of the first TA and the TA adjustment value. The TA adjustment value may also be referred to as a time adjustment amount or a timing adjustment offset (TA offset).

When the method is executed by a terminal device, the terminal device determines the format of the RAR message in the random access process according to whether it has the positioning capability, so as to receive the RAR message with the format.

When the method is executed by a network device, the network device can determine the format of the RAR message according to whether the terminal device has the positioning capability, so as to send the RAR message with the format.

For example, when the terminal device has the positioning: capability, it is determined that the format is a first RAR format; or when the terminal device does not have the positioning capability, it is determined that the format is the second RAR format.

The maximum value of the TA adjustment value available for transmission in the first RAR format is smaller than the maximum value of the TA adjustment value available for transmission in the second RAR format.

The network device carries the TA adjustment value in the RAR message, and the terminal device determines a third TA, for transmitting the third message based on the TA adjustment value. The TA adjustment value can be used to adjust the first TA to obtain the third in the embodiment of the present application, two RAR message formats can be configured. For a terminal device with the positioning capability, the first TA used can be determined relatively accurately, and the range of the TA adjustment value carried in the RAR message is small, so the RAR message needs to be transmitted in the second RAR format. For a terminal device that does not have the positioning capability, the first TA used by it is not accurate, and the TA adjustment value carried in the RAR message has a large range, so it is necessary to use the first RAR format to transmit the RAR message.

In an implementation, the network device may determine whether the terminal device has the positioning capability according to the PRACH resource used by the terminal device to send the first message, and further determine the format of the RAR message in the random access process according to whether the terminal device has the positioning capability.

It should be understood that in a specific implementation, the network device may directly determine the format of the RAR message according to the PRACH resource.

For example, when the preamble in the first message is the first preamble, the network device determines the format of the RAR message is the first RAR format; when the preamble in the first message is the second preamble, the network device determines that the format of the RAR message is the second RAR format. The first preamble and the second preamble belong to two preamble groups configured separately for terminal devices with and without the positioning capability, respectively.

For another example, when the RACH occasion used by the first message is the first RACH occasion, the network device determines that the format of the RAR message is the first RAR format; or, when the RACH occasion is the second RACH occasion, the network device determines that the format of the RAR message is the second RAR format. The duration of the second RACH occasion is greater than the duration of the first RACH occasion.

In another implementation, the network device may determine the format of the RAR message according to the TA adjustment value carried in the RAR message.

For example, when the TA adjustment value is less than or equal to a threshold, the network device determines that the format of the RAR message is the first RAR format; or, when the TA adjustment value is greater than the threshold, the network device determines that the format of the RAR message is the second RAR format.

Especially for the terminal device that do not have the positioning capability, since it cannot accurately estimate the TA value, the network device can determine the format of the RAR message based on the magnitude of the TA adjustment value carried in the RAR message. If a large adjustment is made to the TA of the terminal device, the TA adjustment value is large, and the first RAR format needs to be used for transmission. If a small adjustment is made to the TA of the terminal device, the TA adjustment value is small, and the second RAR format can be used.

Further, in an embodiment, the network device may send first indication information to the terminal device, where the first indication information is used to indicate the format of the RAR message. Correspondingly, the terminal device receives the first indication information, thereby determining whether to receive the RAR message based on the first RAR format or the second RAR format.

For example, the first indication information may be carried in a medium access control (MAC) subheader (MAC subheader).

The above two implementations can be implemented separately or in combination.

For example, the terminal device selects the PRACH resource and determines the format of the RAR message based on whether it has the positioning capability, and the network device determines the format of the RAR message based on the PRACH resource selected by the terminal device. Since for the terminal device with the positioning capability, both the terminal device and the network device can determine that the RAR format is the first RAR format, and for the terminal device without the positioning capability, both the terminal device and the network device can determine that the RAR format is the second RAR format. At this time, the network device may not send the first indication information to indicate the RAR format.

For another example, whether it is a terminal device with or without the positioning capability, the network device determines the used RAR format based on the magnitude of the TA adjustment value in the RAR message. If the TA adjustment value required by a certain terminal device exceeds the threshold, the corresponding RAR format is the second RAR format. If the TA adjustment value required by a certain terminal device is less than or equal to the threshold, the corresponding RAR format is the first RAR format. At this time, the network device can indicate the RAR format to the terminal device through the first indication information. The threshold is the maximum value of the TA adjustment value available for transmission in the first RAR format.

For another example, the terminal device selects the PRACH resource and determines the format of the RAR message based on whether it has the positioning, capability, and the network device determines whether the terminal device has the positioning capability according to the PRACH resource selected by the terminal device. If the network device determines that the terminal device has the positioning capability, for the terminal device with the positioning capability, the RAR format is the first RAR format. If the network device determines that the terminal device does not have the positioning capability, it further determines the RAR format according to the magnitude of the TA adjustment value configured for the terminal device. The RAR format used when the TA adjustment value required by the terminal device that does not have the positioning capability exceeds the threshold is the second RAR format, and the RAR format used when the TA adjustment value is less than or equal to the threshold is the first RAR format. At this time, since the PRACH resources selected by the terminal device with the positioning capability and the terminal device without the positioning capability are different, the RA-RNTIs determined based on the PRACH resources are also different. Therefore, for a terminal device with the positioning capability, the network device may not send the first indication information to indicate the RAR format, and for a terminal device without the positioning capability, the network device may send the first indication information to indicate the RAR format.

For another example, the terminal device selects the PRACH resource and determines the format of the RAR message based on whether it has the positioning capability, and the network device determines whether the terminal device has the positioning capability according to the PRACH resource selected by the terminal device. If the network device determines that the terminal device does not have the positioning capability, for the terminal device without the positioning capability, the RAR format is the second RAR format. If the network device determines that the terminal device has the positioning capability, it further determines the RAR format according to the magnitude of TA adjustment value configured for the terminal device. The RAR format used when the TA adjustment value required by the terminal device with the positioning capability exceeds the threshold is the second RAR format, and the RAR format used when the TA adjustment value is less than or equal to the threshold is the first RAR format. At this time, for the terminal device with the positioning capability, the network device may send first indication information to indicate the RAR format.

In the embodiment of this application, it is also possible to configure only one RAR message format, the length of the format is fixed, but the range of TA adjustment values available for transmission in the format can be configured to be different, and is indicated by the indication information such as a 1 bit of RAR header, for example, when the bit is 0, it represents that the TA adjustment value indicated by the value in the RAR message belongs to range 1, and when this bit is 1, it represents that the TA adjustment value indicated by the value in the RAR message belongs to range 2. Assuming that the TA adjustment value corresponding to range 1 is 0-65, and the TA adjustment value corresponding to range 2 is 66-129. For example, if the TA adjustment value carried in the RAR message is 000000, and if the indication information indicates range 1, the terminal device determines that the TA adjustment value is 0, and if the indication information indicates range 2, the terminal device determines The TA adjustment value is 66. If the TA adjustment value carried in the RAR message is 000001, and if the indication information indicates range 1, the terminal device determines that the TA adjustment value is 1, and if the indication information indicates range 2, the terminal device determines the TA adjustment value is 67.

In addition, if the terminal device is in the connected state, the terminal device can also report information of whether the terminal device has the positioning capability to the network device, so that the network device determines the RAR format according to whether the terminal device has the positioning capability.

In this embodiment, the format of the random access response RAR message in the random access process is determined according to whether the terminal device has the positioning capability, which adapts to the random access process of terminal devices with different capabilities, avoids unnecessary resource overhead while ensuring effective random access at the same time.

For the methods shown in FIGS. 4 to 6, after receiving the RAR message sent by the network device, the terminal device determines the third TA used to send the third message in the random access process according to the first TA and the TA adjustment value carried in the RAR message.

Further, the terminal device sends the third message. Correspondingly, the network device receives the third message sent by the terminal device.

In an embodiment, the third message includes TA information. The TA information includes the first TA, the difference between the second TA and the first TA, or the third TA.

For example, the third message may further include third indication information, and the third indication information is used to indicate whether the third message includes the TA information. The third indication information is, for example, carried in a MAC CE subheader (MAC subheader), for example, adding 1 bit to the MAC subheader.

Of course, the third message may not carry the TA information and the third indication information, in this case, it means that the terminal device does not have the positioning capability, or that the terminal device uses the second TA broadcast by the network device to send the first message.

The TA information may, for example, be carried in a TA command medium access control-control element (MAC CE) (TA command MAC CE).

If the terminal device determines the first TA by itself, for example, the terminal device determines the distance with the network device based on its own position, determines an estimated value based on the distance, and uses the sum of the estimated value and the second TA as the first TA to be used. At this time, the terminal device can report the information of the first TA to the network device, and the network device determines the third TA according to the first TA and the TA adjustment value in the RAR message; or, the terminal device reports the estimated value, i.e. the difference between the first TA and the second TA, to the network device, and the network device determines the first TA according to the second TA and the estimated value, and determines the third TA based on the first TA and TA adjustment value in the RAR message; or, the terminal device reports the third TA to the network device directly.

After acquiring the third TA, the network device sends the third message to the terminal device based on the third TA.

For example, the TA information may further include second indication information, where the second indication information is used to indicate whether the first TA is determined based on the second TA.

It should be understood that the terminal device may determine the first TA used to send the first message based on the second TA broadcast by the network device, or may not determine the first TA based on the second TA, for example, based on the distance between the terminal device and the network device directly and estimate the first TA by itself. At this time, the terminal device can inform the network device whether it uses the second TA When sending the third message.

If the terminal device uses the second TA, the TA information carries second indication information to indicate that it uses the second TA; if the terminal device does not use the second TA, the TA information may not carry the second indication information, but only information of the first TA or the third TA.

For example, the terminal device has the positioning capability, and uses the first TA estimated by itself when sending the first message, and does not use the second TA in the system broadcast message, then the terminal device needs to report the first TA estimated by itself and indication information used to indicate that the second TA is not used; the terminal device has the positioning capability, and uses the first TA estimated by itself when sending the first message, and the first TA is determined based on the second TA broadcast by the network device, at this time the terminal device needs to report its TA value.

It should be noted that, under the premise of no conflict, the various embodiments described in this application and/or the technical features in each embodiment can be combined with each other arbitrarily, and the technical solutions obtained after the combination should also fall within the protection scope of the present application.

In the various embodiments of the present application, the magnitude of the sequence numbers of the above-mentioned processes does not mean the order of execution. The execution order of each process should be determined by its function and internal logic, and should not constitute any limitation to the implementation process of the embodiments of the present application.

The random access method according to the embodiment of the present application is described in detail above. The apparatus according to the embodiment of the present application will be described below in conjunction with FIG. 7 to FIG. 11. The technical features described in the method embodiments are applicable to the following apparatus embodiments.

Figure 7:
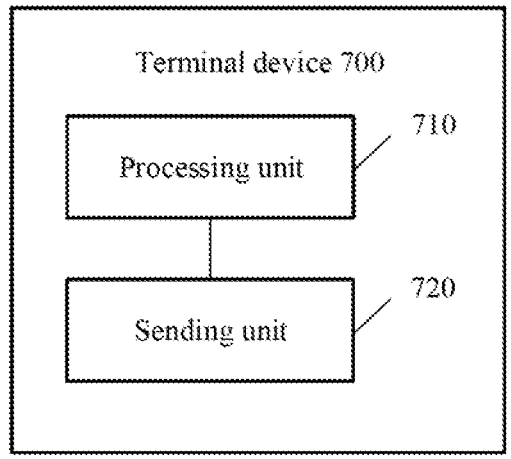
FIG. 7 is a schematic block diagram of a terminal device according to an embodiment of the present application.

FIG. 7 is a schematic block diagram of a terminal device 700 according to an embodiment of the present application. As shown in FIG. 7, the terminal device 700 includes:
- a processing unit 710, configured to determine a first TA;
- a sending unit 720, configured to send a first message in a random access process based on the first TA.

Therefore, the terminal device can determine the first TA by itself, and send the first message (Msg 1 or Msg A) in the random access process based on the first TA, thereby reducing bit overhead used by the network device to indicate TA for the terminal device in the random access process.

In an embodiment, the processing unit 710 is specifically configured to determine the first TA according to location information of the terminal device and/or a second TA from a network device when the terminal device has positioning capability; and/or, determine the second TA as the first TA when the terminal device does not have positioning capability.

In an embodiment, the processing unit 710 is specifically configured to: determine first information used to characterize a distance between the terminal device and the network device according to the location information of the terminal device; determine the first TA according to the first information and the second TA.

In an embodiment, the network device is a satellite, and the distance between the terminal device and the network device is a distance between the terminal device and the satellite; or, the network device is a ground station, and the distance between the terminal device and the network device is a sum of a distance between the terminal device and the satellite, and a distance between the satellite and the ground station.

In an embodiment, the first information includes at least one of the following information: round-trip time RTT; a transmission delay; satellite ephemeris; the distance between the terminal device and the network device; a trajectory of the terminal device relative to a satellite.

In an embodiment, the information of the second TA is carried in a system message.

In an embodiment, the second TA is any one of the following: a TA between the terminal device and a transparent geostationary earth orbit GEO; a TA between the terminal device and a transparent low-earth orbit LEO; a TA between the terminal device and a regenerated GEO; TA between the terminal device and a regenerated LEO; a sum of a TA between the terminal device and a transparent GEO, and a TA between a transparent GEO and a ground station; a sum of the TA between the terminal device and a transparent LEO and a TA between a transparent LEO and a ground station.

In an embodiment, the processing unit 710 is further configured to: determine a physical random access channel PRACH resource according to whether the terminal device has positioning capability; the sending unit 720 is specifically configured to send the first message with the PRACH resource.

In an embodiment, the PRACH resource includes a random access channel RACH occasion, and the processing unit 710 is specifically configured to: determine that the RACH occasion is a first RACH occasion when the terminal device has the positioning capability; or, determine that the RACH occasion is a second RACH occasion when the terminal device does not have the positioning capability, where a duration of the second RACH occasion is greater than a duration of the first RACH occasion.

In an embodiment, the PRACH resource includes a preamble, and the processing unit 710 is specifically configured to: determine that the preamble is the first preamble when the terminal device has the positioning capability; or, determine that the preamble is a second preamble when the terminal device does not have the positioning capability, where the first preamble and the second preamble belong to two preamble groups configured separately liar terminal devices with and without the positioning capability, respectively.

In an embodiment, the processing unit 710 is further configured to: determine a format of a random access response RAR message in the random access process according to whether the terminal device has the positioning capability, where the RAR message includes a TA adjustment value.

In an embodiment, the processing unit 710 is specifically configured to: determine that the format is a first RAR format when the positioning capability is available; or, determine that the format is the second RAR format when the positioning capability is not available, where a maximum value of the TA adjustment value available for transmission in the first RAR format is smaller than a maximum value of the TA adjustment value available for transmission in the second RAR format.

In an embodiment, the terminal device further includes: a receiving unit, configured to receive first indication information, where the first indication information is used to indicate a format of a RAR message in the random access process.

In an embodiment, the first indication information is carried in a medium access control MAC subheader.

In an embodiment, the processing unit 710 is further configured to: determine a third TA for sending a third message in the random access process according to the first TA and the TA adjustment value carried in the RAR message.

In an embodiment, the sending unit 720 is further configured to: send the third message, where the third message includes TA information, and the TA information includes the first TA, a difference between the second TA and the first TA, or the third TA.

In an embodiment, the TA information further includes second indication information, and the second indication information is used to indicate whether the first TA is determined based on the second TA.

In an embodiment, the TA information is carried in TA commend MAC CE.

In an embodiment, the third message further includes third indication information, and the third indication information is used to indicate whether the third message includes the TA information.

In an embodiment, the third indication information is carried in a MAC CE subheader.

In an embodiment, the terminal device is applied to the NTN system.

Figure 8:
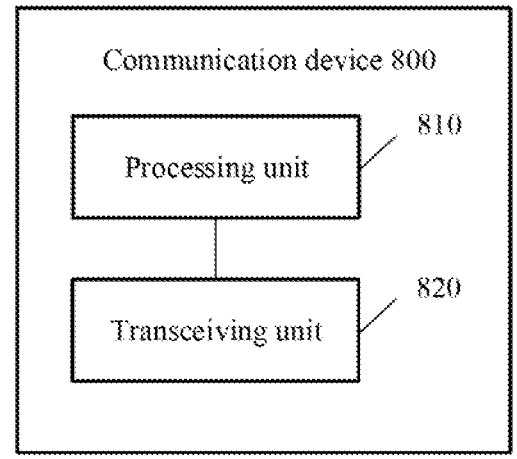
FIG. 8 is a schematic block diagram of a communication device according to an embodiment of the present application.

FIG. 8 is a schematic block diagram of a communication device 800 according, to an embodiment of the present application. As shown in FIG. 8, the communication device 800 includes:

a processing unit 810, configured to determine the format of a random access response RAR message in a random access process according to whether a terminal device has the positioning capability, where the RAR message includes a TA adjustment value, and the TA adjustment value is used for the terminal device to determine a third TA used to transmit a third message in the random access process;

a transceiving unit 820, configured to send or receive the RAR message according to the format.

Therefore, the format of the random access response RAR message in the random access process is determined according to whether the terminal device has the positioning capability, which adapts to the random access process of terminal devices with different capabilities, and avoids unnecessary resource overhead while ensuring effective random access at the same time.

In an embodiment, the processing unit 810 is specifically configured to determine the format of the RAR message according to whether the terminal device has positioning capability.

In an embodiment, the processing unit 810 is specifically configured to: determine that the format is a first RAR format when the terminal device has the positioning capability; or, determine that the format is a second RAR format when the terminal device does not have the positioning capability, where a maximum value of the TA adjustment value available for transmission in the first RAR format is smaller than a maximum value of the TA adjustment value available for transmission in the second RAR format.

In an embodiment, the communication device is a network device, and the processing unit 810 is specifically configured to: determine whether the terminal device has the positioning capability according to a physical random access channel PRACH resource used by a first message received in the random access process.

In an embodiment, the PRACH resource includes a random access channel RACH occasion, and the processing unit 810 is specifically configured to: determine that the terminal device has the positioning capability when the RACH occasion is a first RACH occasion; or, determine that the terminal device does not have the positioning capability when the RACH occasion is a second RACH occasion, where a duration of the second RACH occasion is greater than a duration of the fast RACH occasion.

In an embodiment, the PRACH resource includes a preamble, and the processing unit 810 is specifically configured to: determine that the terminal device has the positioning capability when the preamble is a first preamble; or, determine that the terminal device does not have the positioning capability when the preamble is a second preamble, where the first preamble and the second preamble belong to two preamble groups configured separately for terminal devices with and without the positioning capability, respectively.

In an embodiment, the communication device is executed by a network device, and the processing unit 810 is specifically configured to determine the format of the RAR message according to the TA adjustment value carried in the RAR message.

In an embodiment, the processing unit 810 is specifically configured to: determine that the format of the RAR message is the first RAR format when the TA adjustment value is less than or equal to a threshold; or, determine that the format of the RAR message is a second RAR format when the TA adjustment value is greater than the threshold, where a maximum value of the TA adjustment value available for transmission in the first RAR format is smaller than the maximum value of the TA adjustment value available for transmission in the second RAR Format value.

In an embodiment, the transceiving unit 820 is further configured to send first indication information to the terminal device, where the first indication information is used to indicate the format of the RAR message.

In an embodiment, the first indication information is carried in a medium access control MAC subheader.

In an embodiment, the communication device is a network device, and the transceiving unit 820 is further configured to send a second TA to the terminal device, where the second TA is used for the terminal device to determine the first TA to send the first message.

In an embodiment, the information of the second TA is carried in a system message.

In an embodiment, the second TA is any one of the following: a TA between the terminal device and a transparent geostationary earth orbit. GEO; a TA between the terminal device and a transparent low-earth orbit LEO; a TA between the terminal device and a regenerated GEO; a TA between the terminal device and a regenerated LEO; a sum of a TA between the terminal device and a transparent GEO, and a TA between a transparent GEO and a ground station; a sum of a TA between the terminal device and a transparent LEO and a TA between a transparent LEO and a ground station.

In an embodiment, the transceiving unit 820 is further configured to: receive the third message sent by the terminal device, where the third message includes TA information, and the TA information includes the first TA, the difference between the second TA and the first TA, or the third TA used for sending the third message, where the third TA is determined by the terminal device according to the first TA and the TA adjustment value.

In an embodiment, the TA information further includes second indication information, and the second indication information is used to indicate whether the first TA is determined based on the second TA.

In an embodiment, the TA information is carried in a TA commend MAC CE.

In an embodiment, the third message further includes third indication information, and the third indication information is used to indicate whether the TA information is included in the third message.

In an embodiment, the third indication information is carried in a MAC CE subheader.

In an embodiment, the communication device is applied, to the NTN system.

Figure 9:
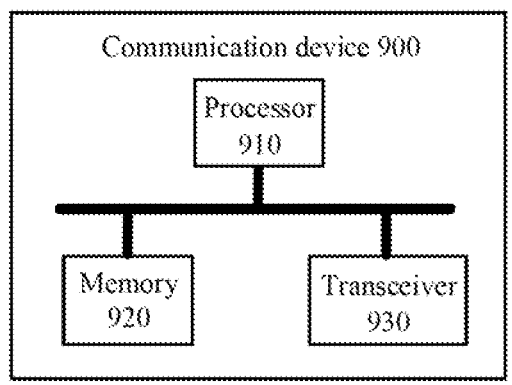
FIG. 9 is a schematic structural diagram of a communication device according to an embodiment of the present application.

FIG. 9 is a schematic structural diagram of a communication device 900 according to an embodiment of the present application. The communication device 900 shown in FIG. 9 includes a processor 910, and the processor 910 can call and run a computer program from the memory to implement the method in the embodiment of the present application.

In an embodiment, as shown in FIG. 9, the communication device 900 may further include a memory 920. The processor 910 can call and run a computer program from the memory 920 to implement the method in the embodiment of the present application.

The memory 920 may be a separate means independent of the processor 910, or may be integrated in the processor 910.

In an embodiment, as shown in FIG. 9, the communication device 900 may further include a transceiver 930, and the processor 910 may control the transceiver 930 to communicate with other devices. Specifically, it may send information or data to other devices, or receive information or data from other devices.

The transceiver 930 may include a transmitter and a receiver. The transceiver 930 may further include an antenna, and the number of antennas may be one or more.

In an embodiment, the communication device 900 may specifically be a terminal device of an embodiment of the present application, and the communication device 900 may implement corresponding procedures implemented by the terminal device in each method of the embodiment of the present application. For the sake of brevity, details are not described herein again.

In an embodiment, the communication device 900 may specifically be a network device of an embodiment of the present application, and the communication device 900 may implement corresponding procedures implemented by the network device in each method of the embodiment of the present application. For the sake of brevity, details are not described herein again.

Figure 10:
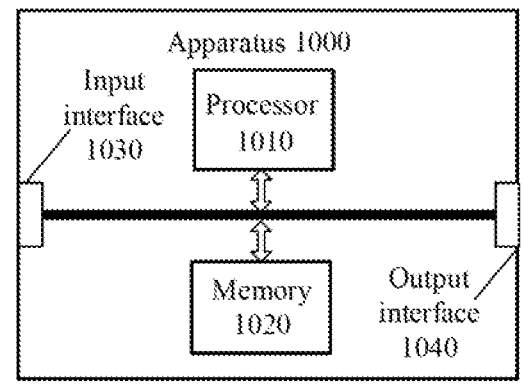
FIG. 10 is a schematic structural diagram of an apparatus for random access according to an embodiment of the present application.

FIG. 10 is a schematic structural diagram of an apparatus for random access according to an embodiment of the present application. The apparatus 1000 shown in FIG. 10 includes a processor 1010, and the processor 1010 can call and run a computer program from a memory to implement the method in the embodiment of the present application.

In an embodiment, as shown in FIG. 10, the apparatus 1000 may further include a memory 1020. The processor 1010 can call and run a computer program from the memory 1020 to implement the method in the embodiment of the present application.

The memory 1020 may be a separate means independent of the processor 1010, or may be integrated in the processor 1010.

In an embodiment, the apparatus 1000 may further include an input interface 1030. The processor 1010 can control the input interface 1030 to communicate with other devices or chips, and specifically, can acquire information or data sent by other devices or chips.

In an embodiment, the apparatus 1000 may further include an output interface 1040. The processor 1010 can control the output interface 1040 to communicate with other devices or chips, and specifically, can output information or data to other devices or chips.

In an embodiment, the apparatus 1000 may be applied to the network device in the embodiment of the present application, and the communication apparatus may implement the corresponding procedures implemented by the network device in the various methods of the embodiment of the present application. For the sake of brevity, details are not described herein again.

In an embodiment, the apparatus 1000 may be applied to the terminal device in the embodiment of the present application, and the communication apparatus may implement the corresponding procedures implemented by the terminal device in the various methods of the embodiment of the present application. For the sake of brevity, details are not described herein again.

In an embodiment, the apparatus 1000 may be a chip. The chip may also be a system-level chip, a system chip, a chip system, or a system-on-chip.

The processor in the embodiment of the present application may be an integrated circuit chip with signal processing capability. In the implementation process, the steps of the foregoing method embodiments can be completed by hardware integrated logic circuits in the processor or instructions in the form of software. The aforementioned processor can be a general-purpose processor, a digital signal processor (DSP), an application specific integrated circuit (ASIC), a field programmable gate array (FPGA) or other programmable logic means, discrete gates or transistor logic means, discrete hardware components. The methods, steps, and logical block diagrams disclosed in the embodiments of the present application can be implemented or executed. The general-purpose processor may be a microprocessor or the processor may also be any conventional processor or the like. The steps of the method disclosed in the embodiments of the present application may be directly embodied as being executed and completed by a hardware decoding processor, or executed and completed by a combination of hardware and software modules in the decoding processor. The software module can be located in a mature storage medium in the field, such as random access memory, flash memory, read only memory, programmable read only memory, or electrically erasable programmable memory, registers. The storage medium is located in the memory, and the processor reads the information in the memory and completes the steps of the above method in combination with its hardware.

The memory in the embodiments of the present application may be volatile memory or non-volatile memory, or may include both volatile and non-volatile memory. Among them, the non-volatile memory can be read-only memory (ROM), programmable read-only memory (Programmable ROM, PROM), erasable programmable read only memory (Erasable PROM, EPROM), and electrically erasable programmable read-only memory (Electrically EPROM, EEPROM) or flash memory. The volatile memory may be a random access memory (RAM), which is used as an external cache, By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), Double Data Rate SDRAM (DDR SDRAM), Enhanced Synchronous Dynamic Random Access Memory (Enhanced SDRAM, ESDRAM), Synchronous Link Dynamic Random Access Memory (Synchlink DRAM, SLDRAM) and direct Rambus RAM (DR RAM).

The foregoing memory is exemplary but not restrictive. For example, the memory in the embodiment of the present application may also be static random access memory (Static RAM, SRAM), dynamic random access memory (Dynamic RAM, DRAM), and synchronous Dynamic random access memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic Random access memory (Synch Link DRAM, SLDRAM) and Direct. Rambus RAM (DR RAM) and so on. That is to say, the memory in the embodiments of the present application is intended to include, but is not limited to, these and any other suitable types of memory.

Figure 11:
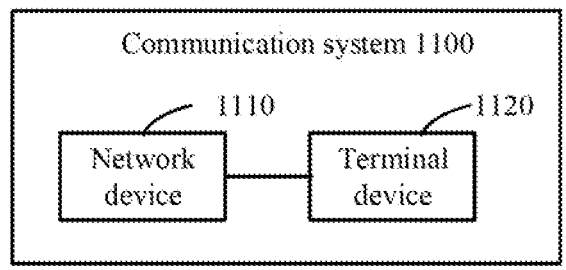
FIG. 11 is a schematic diagram of a communication system according to an embodiment of the present application.

FIG. 11 is a schematic block diagram of a communication system 1100 according to an embodiment of the present application. As shown in FIG. 11, the communication system 1100 includes a network device 1110 and a terminal device 1120.

The network device 1110 is configured to send a second TA to the terminal device.

The terminal device 1120 is configured to receive the second TA; determine the first TA according to the location information of the terminal device and/or the second TA; and send a first message in the random access process based on the first TA.

The network device 1110 can he used for the corresponding functions implemented by the network device in the methods shown in FIG. 4 to FIG. 6, and the composition of the network device 1110 can be as Shown in the communication device 800 in FIG. 8, For the sake of brevity, details are not described herein again.

The terminal device 1120 can be used to implement the corresponding functions implemented by the terminal device in the methods shown in FIG. 4 to FIG. 6, and the composition of the terminal device 1120 can be as shown in the communication device 800 in FIG. 8. For the sake of brevity, details are not described herein again.

The embodiments of the present application also provide a computer-readable storage medium for storing computer programs. In an embodiment, the computer-readable storage medium can be applied to the terminal device in the embodiment of the present application, and the computer program causes the computer to execute the corresponding process implemented by the terminal device in each method of the embodiment of the present application. For the sake of brevity, details are not described herein again. In an embodiment, the computer-readable storage medium can be applied to the network device in the embodiment of the present application, and the computer program causes the computer to execute the corresponding process implemented by the network device in each method of the embodiment of the present application. For the sake of brevity, details are not described herein again.

The embodiments of the present application also provide a computer program product, including computer program instructions. In an embodiment, the computer program product can be applied to the terminal device in the embodiment of the present application, and the computer program instructions cause the computer to execute the corresponding process implemented by the terminal device in each method of the embodiment of the present application. For the sake of brevity, details are not described herein again. In an embodiment, the computer program product can be applied to the network device in the embodiment of the present application, and the computer program instructions cause the computer to execute the corresponding process implemented by the network device in each method of the embodiment of the present application. For the sake of brevity, details are not described herein again.

The embodiment of the present application also provides a computer program. In an embodiment, the computer program can be applied to the terminal device in the embodiment of the present application. When running on the computer, the computer is caused to execute the corresponding process implemented by the terminal device in each method of the embodiment of the present application. For the sake of brevity, details are not described herein again. In an embodiment, the computer program can be applied to the network device in the embodiment of the present application. When the computer program is running on the computer, the computer is caused to execute the corresponding process implemented by the network device in each method of the embodiment of the present application. For the sake of brevity, details are not described herein again.

The terms "system" and "network" in the embodiments of the present application are often used interchangeably herein. The term "and/or" in this document is only an association relationship describing the associated objects, which means that there can be three kinds of relationships, for example, A and/or B can mean three situation: A alone exists, A and B exist at the same time, B exist alone these three situations. In addition, the character "/" in this document generally indicates that the associated objects before and after are in an "or" relationship.

In the embodiment of the present application, "B corresponding (corresponds) to A" means that B is associated with A, and B can be determined according to A. However, it should also be understood that determining B based on A does not mean that B is determined only based on A, and B can also be determined based on A and/or other information.

A person of ordinary skill in the art may be aware that the units and algorithm steps of the examples described in the embodiments disclosed in this document can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of this application.

Those skilled in the art can clearly understand that, for the convenience and conciseness of description, the specific working process of the system, apparatus and unit described above can refer to the corresponding process in the foregoing method embodiment, which will not be repeated here.

In the several embodiments provided in this application, it should be understood that the disclosed system, apparatus, and method may he implemented in other ways. For example, the apparatus embodiment described above is only illustrative. For example, the division of the unit is only a logical function division. In actual implementation, there may be other division methods. For example, multiple units or components may be combined or may be Integrate into another system, or some features can be ignored or not implemented in addition, the displayed or discussed mutual coupling or direct coupling or communication connection may be indirect coupling or communication connection through sonic interfaces, apparatuses or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the present application may be integrated into one processing unit, or each unit may exist, alone physically, or two or more units may be integrated into one uni.

If the function is implemented in the form of a software functional unit and sold or used as an independent product, it can be stored in a computer readable storage medium. Based on this understanding, the technical solution of the present application essentially or the part that contributes to the existing technology or the part of the technical solution can be embodied in the form of a software product, and the computer software product is stored in a storage medium, including several instructions are used to make a computer device (which may be a personal computer, a server, or a network device, etc.) execute all or part of the steps of the methods described in the various embodiments of the present application. The aforementioned storage media include: U disk, mobile hard disk, read-only memory (ROM), random access memory (RAM), magnetic disk or optical disk and other media that can store program code.

The above are only specific implementations of this application, but the protection scope of this application is not limited to this. Any person skilled in the art can easily think of changes or substitutions within the technical scope disclosed in this application, and the changes or substitutions should be covered within the scope of protection of this application. Therefore, the protection scope of this application shall be subject to the protection scope of the claims.

What is claimed is:

1. A random access method, comprising:
   determining, by a terminal device, a first timing advance (TA); and
   sending, by the terminal device, a first message in a random access process based on the first TA;
   wherein determining, by the terminal device, the first TA comprises:
   determining the first TA according to location information of the terminal device and a second TA from a network device when the terminal device has positioning capability.

2. A terminal device, comprising a processor and a memory, the memory is used to store a computer program, and the processor is used to call and run the computer program stored in the memory to:
   determine a first timing advance (TA); and
   the processor is further enabled to control a transceiver to send a first message in a random access process based on the first TA;
   wherein the processor is enabled to:
   determine the first TA according to location information of the terminal device and a second TA from a network device when the terminal device has positioning capability.

3. The terminal device according to claim 2, wherein the processor is further enabled to:
   determine the second TA as the first TA when the terminal device does not have positioning capability.

4. The terminal device according to claim 3, wherein the processor is further enabled to:
   determine first information used to characterize a distance between the terminal device and the network device according to the location information of the terminal device; and
   determine the first TA according to the first information and the second TA.

5. The terminal device according to claim 4, wherein:
   the network device is a satellite, and the distance between the terminal device and the network device is a distance between the terminal device and the satellite; or,
   the network device is a ground station, and the distance between the terminal device and the network device is a sum of a distance between the terminal device and the satellite and a distance between the satellite and the ground station.

6. The terminal device according to claim 4, wherein the first information comprises at least one of the following information:
   round trip time (RTT);
   a transmission delay;
   satellite ephemeris;
   the distance between the terminal device and the network device;
   a trajectory of the terminal device relative to a satellite.

7. The terminal device according to claim 3, wherein the information of the second TA is carried in a system message, and the second TA is any one of the following:
   a TA between the terminal device and a transparent geostationary earth orbit (GEO);
   a TA between the terminal device and a transparent low-earth orbit (LEO);
   a TA between the terminal device and a regenerated GEO;
   a TA between the terminal device and a regenerated LEO;
   a sum of a TA between the terminal device and a transparent GEO, and a TA between a transparent GEO and a ground station;
   a sum of a TA between the terminal device and a transparent LEO and a TA between a transparent LEO and a ground station.

8. The terminal device according to claim 2, wherein:
   the processor is further enabled to determine a physical random access channel (PRACH) resource according to whether the terminal device has positioning capability; and
   the processor is further enabled to control the transceiver to send the first message with the PRACH resource;
   wherein the PRACH resource comprises a random access channel (RACH) occasion, and the processor is further enabled to:
   determine the RACH occasion is a first RACH occasion when the terminal device has the positioning capability; or,
   determine the RACH occasion is a second RACH occasion when the terminal device does not have the positioning capability, wherein a duration of the second RACH occasion is greater than a duration of the first RACH occasion.

9. The terminal device according to claim 8, wherein the PRACH resource comprises a preamble, and the processor is further enabled to:
   determine the preamble is a first preamble when the terminal device has the positioning capability; or,
   determine the preamble is a second preamble when the terminal device does not have the positioning capability, wherein the first preamble and the second preamble belong to two preamble groups configured separately for terminal devices with and without the positioning capability, respectively.

10. The terminal device according to claim 2, wherein the processor is further enabled to:

determine a format of a random access response (RAR) message in the random access process according to whether the terminal device has the positioning capability, wherein the RAR message comprises a TA adjustment value;

wherein the processor is further enabled to:
determine the format is a first RAR format when the terminal device has the positioning capability; or,
determine the format is a second RAR format when the terminal device does not has the positioning capability, wherein a maximum value of a TA adjustment value available for transmission in the first RAR format is smaller than a maximum value of a TA adjustment value available for transmission in the second RAR format.

11. The terminal device according to claim 10, wherein the processor is further enabled to:
determine a third TA for sending a third message in the random access process according to the first TA and the TA adjustment value carried in the RAR message; and
the processor is further enabled to control the transceiver to send the third message, wherein the third message comprises TA information, and the TA information comprises the first TA, a difference between the second TA and the first TA, or the third TA.

12. The terminal device according to claim 11, wherein the TA information further comprises second indication information, and the second indication information is used to indicate whether the first TA is determined based on the second TA;
wherein the TA information is carried in a TA command medium access control-control element (MAC CE).

13. The terminal device according to claim 11, wherein the third message further comprises third indication information, and the third indication information is used to indicate whether the TA information is comprised in the third message;
wherein the third indication information is carried in a MAC CE subheader.

14. The terminal device according to claim 2, wherein the processor is further enabled to control the transceiver to receive first indication information, wherein the first indication information is used to indicate a format of a RAR message in the random access process;
wherein the first indication information is carried in a media access control MAC subheader.

15. A communication device, applied to a network device and comprising a processor and a memory, the memory is used to store a computer program, and the processor is used to call and run the computer program stored in the memory to:
receive a first message sent by a terminal device based on a first timing advance (TA), wherein the first TA is determined by the terminal device according to location information of the terminal device and a second TA from the network device when the terminal device has positioning capability;
determine a format of a random access response (RAR) message in a random access process, wherein the RAR message comprises a TA adjustment value, and the TA adjustment value is used for a terminal device to determine a third TA used to transmit a third message in the random access process; and
the processor is further enabled to control a transceiver to send the RAR message according to the format of the RAR message.

16. The communication device according to claim 15, wherein the processor is further enabled to:
determine the format of the RAR message according to whether the terminal device has positioning capability;
wherein the processor is further enabled to;
determine the format is a first RAR format when the terminal device has the positioning capability; or,
determine the format is a second RAR format when the terminal device does not have the positioning capability, wherein a maximum value of the TA adjustment value available for transmission in the first RAR format is smaller than a maximum value of the TA adjustment value available for transmission in the second RAR format.

17. The communication device according to claim 16, wherein the processor is further enabled to:
determine whether the terminal device has the positioning capability according to a physical random access channel (PRACH) resource used by the first message received in the random access process;
wherein the PRACH resource comprises a random access channel (RACH) occasion, and the processor is further enabled to:
determine that the terminal device has the positioning capability when the RACH occasion is a first RACH occasion; or,
determine that the terminal device does not have the positioning capability when the RACH occasion is a second RACH occasion, wherein a duration of the second RACH occasion is greater than a duration of the first RACH occasion.

18. The communication device according to claim 17, wherein the PRACH resource comprises a preamble, and the processor is further enabled to:
determine that the terminal device has the positioning capability when the preamble is a first preamble; or,
determine that the terminal device does not have the positioning capability when the preamble is a second preamble, wherein the first preamble and the second preamble belong to two preamble groups configured separately for terminal devices with and without the positioning capability, respectively.

19. The communication device according to claim 16, wherein the processor is further enabled to:
determine the format of the RAR message according to the TA adjustment value carried in the RAR message;
wherein the processor is further enabled to:
determine the format of the RAR message is a first RAR format when the TA adjustment value is less than or equal to a threshold; or,
determine the format of the RAR message is a second RAR format when the TA adjustment value is greater than the threshold, wherein a maximum value of the TA adjustment value available for transmission in the first RAR format is smaller than a maximum value of the TA adjustment value available for transmission in the second RAR format.

20. The communication device according to claim 19, wherein the processor is further enabled to:
control the transceiver to send first indication information to the terminal device, wherein the first indication information is used to indicate the format of the RAR message;
and the first indication information is carried in a media access control (MAC) subheader.

21. The communication device according to claim 20, wherein the information of the second TA is carried in a system message; and the second TA is any one of the following:
- a TA between the terminal device and the transparent geostationary earth orbit (GEO);
- a TA between the terminal device and a transparent low-earth orbit (LEO);
- a TA between the terminal device and a regenerated GEO;
- a TA between the terminal device and a regenerated LEO;
- a sum of a TA between the terminal device and a transparent GEO, and a TA between a transparent GEO and a ground station;
- a sum of a TA between the terminal device and a transparent LEO and a TA between a transparent LEO and a ground station.

22. The communication device according to claim 15, wherein the communication device is a network device, and the processor is further enabled to:
control the transceiver to send a second TA to the terminal device, wherein the second TA is used for the terminal device to determine the first TA used to send a first message.

23. The communication device according to claim 22, wherein the processor is further enabled to:
control the transceiver to receive the third message sent by the terminal device, wherein the third message comprises TA information, and the TA information comprises the first TA, a difference between the first TA and the second TA, or the third TA used for sending the third message, wherein the third TA is determined by the terminal device according to the first TA and the TA adjustment value.

24. The communication device according to claim 23, wherein the TA information further comprises second indication information, and the second indication information is used to indicate whether the first TA is determined based on the second TA;
wherein the TA information is carried in a TA command medium access control-control element (MAC CE).

25. The communication device according to claim 23, wherein the third message further comprises third indication information, and the third indication information is used to indicate whether the TA information is comprised in the third message;
wherein the third indication information is carried in a MAC CE subheader.

* * * * *